United States Patent
Jung et al.

(10) Patent No.: US 9,445,034 B2
(45) Date of Patent: Sep. 13, 2016

(54) METHOD AND APPARATUS FOR PROCESSING VIDEO IMAGE

(75) Inventors: Kil-Soo Jung, Osan-si (KR); Dae-Jong Lee, Suwon-si (KR); Hye-Young Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 850 days.

(21) Appl. No.: 13/204,362

(22) Filed: Aug. 5, 2011

(65) Prior Publication Data
US 2011/0292176 A1    Dec. 1, 2011

Related U.S. Application Data

(63) Continuation of application No. PCT/KR2010/000905, filed on Feb. 16, 2010.

(60) Provisional application No. 61/160,382, filed on Mar. 16, 2009.

(30) Foreign Application Priority Data

Feb. 17, 2009  (KR) .................... 10-2009-0013152
Feb. 12, 2010  (KR) .................... 10-2010-0013514

(51) Int. Cl.
*H04N 13/00* (2006.01)
*H04N 5/445* (2011.01)
*H04N 13/04* (2006.01)
(Continued)

(52) U.S. Cl.
CPC .......... *H04N 5/445* (2013.01); *H04N 13/0003* (2013.01); *H04N 13/004* (2013.01); *H04N 13/007* (2013.01); *H04N 13/0456* (2013.01);
(Continued)

(58) Field of Classification Search
CPC ................... H04N 13/0055; H04N 13/0239; H04N 19/00769
USPC .............................................. 348/43; 382/232
See application file for complete search history.

(56) References Cited

U.S. PATENT DOCUMENTS 5,696,892 A * 12/1997 Redmann et al. ............ 345/582
5,971,589 A * 10/1999 Hazama et al. .............. 700/145
(Continued)

FOREIGN PATENT DOCUMENTS

CN     1679056 A      10/2005
CN   101228799 A       7/2008
(Continued)

OTHER PUBLICATIONS

European Search Report issued Aug. 2, 2012 in counterpart European Application No. 10743910.1 (10 pages, in English).
(Continued)

*Primary Examiner* — Nhon Diep
(74) *Attorney, Agent, or Firm* — NSIP Law

(57) ABSTRACT

A method of processing video images is provided. The method includes reproducing 3-dimensional (3D) video images by generating left-eye video images and right-eye video images from a video stream, receiving a first command for activating a pop-up interactive graphics stream during the reproduction of the 3D video images, and reproducing 2-dimensional (2D) video images by generating either left-eye video images or right-eye video images from the video stream, in response to the first command for activating the pop-up interactive graphics stream.

16 Claims, 7 Drawing Sheets

(51) Int. Cl.
  *H04N 21/44* (2011.01)
  *H04N 21/81* (2011.01)
  *H04N 21/84* (2011.01)
(52) U.S. Cl.
  CPC ............ *H04N 21/44* (2013.01); *H04N 21/816* (2013.01); *H04N 21/8146* (2013.01); *H04N 21/84* (2013.01)

(56) References Cited

U.S. PATENT DOCUMENTS

| | | | |
|---|---|---|---|
| 6,313,866 | B1 | 11/2001 | Akamatsu et al. |
| 7,046,270 | B2 | 5/2006 | Murata et al. |
| 7,054,478 | B2 | 5/2006 | Harman |
| 7,474,308 | B2 | 1/2009 | Deering |
| 7,689,031 | B2 | 3/2010 | Berretty et al. |
| 7,697,750 | B2 | 4/2010 | Simmons |
| 8,159,529 | B2 | 4/2012 | Yoshida et al. |
| 8,422,801 | B2 * | 4/2013 | Newton et al. ............... 382/232 |
| 8,497,858 | B2 | 7/2013 | Jung et al. |
| 2004/0125447 | A1 | 7/2004 | Sato et al. |
| 2006/0103664 | A1 | 5/2006 | Nakanishi |
| 2007/0247477 | A1 | 10/2007 | Lowry et al. |
| 2008/0198920 | A1 | 8/2008 | Yang et al. |
| 2008/0278573 | A1 | 11/2008 | Ropinski et al. |
| 2008/0303842 | A1 | 12/2008 | Okamoto et al. |
| 2010/0142924 | A1 * | 6/2010 | Yamashita et al. ............. 386/95 |

FOREIGN PATENT DOCUMENTS

| | | |
|---|---|---|
| CN | 101321218 A | 12/2008 |
| EP | 1 548 648 A1 | 6/2005 |
| EP | 1 909 510 A1 | 4/2008 |
| GB | 2 308 204 A | 6/1997 |
| GB | 2 308 284 A | 6/1997 |
| JP | 11-113028 A | 4/1999 |
| JP | 2003-009185 | 1/2003 |
| JP | 2005-229384 A | 8/2005 |
| JP | 2006-191357 A | 7/2006 |
| KR | 10-2004-0022100 A | 3/2004 |
| WO | WO 2008/038205 A2 | 4/2008 |
| WO | WO 2008/044191 A2 | 4/2008 |
| WO | WO 2008/103748 A2 | 8/2008 |
| WO | WO 2008/115222 A1 | 9/2008 |

OTHER PUBLICATIONS

European Search Report issued Aug. 6, 2012 in counterpart European Application No. 10743913.5 (10 pages, in English).
Japanese Office Action issued Dec. 10, 2013 in counterpart Japanese Patent Application No. 2011-550061. (4 pages including partial English translation).
Summons to Oral Proceedings issued Jan. 30, 2014 in counterpart European Patent Application No. 10743910.1 (5 pages in English).
"Blu-ray Disc Format," *Blu-ray Disc Association*, Mar. 2005, pp. 1-35.
Chinese Office Action issued Aug. 8, 2013 in counterpart Chinese Patent Application No. 201080008013.3 (19 pages, in Chinese with English Translation).
Chinese Office Action issued Aug. 29, 2013 in counterpart Chinese Patent Application No. 201080008651.5 (12 pages, in Chinese with English Translation).
Chinese Office Action issued Mar. 28, 2014 in counterpart Chinese Patent Application No. 201080008651.5.
Indonesian Office Action issued Apr. 30, 2014 in counterpart Indonesian Patent Application No. W-00201103325, (8 pages including English translation).
Decision to Refuse issued Jun. 16, 2014 in counterpart European Patent Application No. 10743910.1 (18 pages in English).
Malaysian Notice of Allowance issued on Aug. 29, 2014 in corresponding Malaysian Application No. MY PI 2011003817 (3 pages, in English).
Japanese Office Action issued on Sep. 30, 2014 in corresponding Japanese Application No. JP 2011-550061 (4 pages, with partial English translation).
European Oral Proceedings issued on Sep. 22, 2014 in corresponding European Application No. EP 10743913.5 (5 pages, in English).
Chinese Office Action issued on Oct. 21, 2014 in corresponding Chinese Application No. 201080008013.3 (9 pages, with English translation).
Korean Office Action issued Jan. 29, 2016, in counterpart Korean Application No. 10-2010-0013514 (3 pages in English, 4 pages in Korean).
Korean Notice of Allowance issued on April 20, 2015, in counterpart Korean Application No. 10-2009-0014542 (1 page in English, 6 pages in Chinese).
Chinese Office Action issued on May 7, 2015, in counterpart Chinese Application No. 201080008013.3 (8 pages in English, 5 pages in Chinese).
Japanese Office Action issued Jan. 21, 2014 in counterpart Japanese Patent Application No. 2011-550058. (2 pages including partial English Translation).
Extended European Search Report issued Nov. 21, 2013 in counterpart European Patent Application No. 13161004.0 (5 pages in English).

* cited by examiner

METHOD AND APPARATUS FOR PROCESSING VIDEO IMAGE

CROSS-REFERENCE TO RELATED APPLICATION(S)

This application is a continuation application under 35 U.S.C. §§120 and 365(c) of PCT Application No. PCT/KR2010/000905 filed on Feb. 16, 2010, which claims the benefit under 35 U.S.C. §119(a) of Korean Patent Application Nos. 10-2009-0013152 filed on Feb. 17, 2009 and 10-2010-0013514 filed on Feb. 12, 2010, in the Korean Intellectual Property Office and the benefit under 35 U.S.C. §119(e) of U.S. Provisional Application No. 61/160,382 filed on Mar. 16, 2009, the entire disclosures of which are incorporated herein by reference for all purposes.

BACKGROUND

1. Field

The following description relates to a method and apparatus for processing a video image.

2. Description of Related Art

Along with the development of digital technologies, 3-dimensional (3D) video image technologies are becoming more popular. 3D video image technologies are technologies for reproducing realistic video images by adding depth information to 2-dimensional (2D) images. 3D video image technologies provide vividness and reality as if an object is actually viewed on the spot, and thus, 3D video image technologies are applied in various fields, such as communication, games, medicine, broadcasting, and so on.

Since human eyes are at a predetermined distance apart from each other in a horizontal direction, 2D video images viewed by each eye differ. This phenomenon is referred to as binocular parallax. The brain combines two different 2D video images and generates a 3D video image having stereoscopic view. Methods for embodying 3D video images by using binocular parallax include methods using 3D glasses and methods using a device including a lenticular lens, a parallax barrier, a parallax illumination, etc. instead of using 3D glasses.

SUMMARY

According to an aspect, a method of processing video images is provided. The method includes reproducing 3-dimensional (3D) video images by generating left-eye video images and right-eye video images from a video stream, receiving a first command for activating a pop-up interactive graphics stream during the reproduction of the 3D video images, and reproducing 2-dimensional (2D) video images by generating either left-eye video images or right-eye video images from the video stream, in response to the first command for activating the pop-up interactive graphics stream.

The method may further include receiving a second command for deactivating the pop-up interactive graphics stream, and reproducing 3D video images by generating left-eye video images and right-eye video images from the video stream, in response to the second command for deactivating the pop-up interactive graphics stream.

In the operation of reproducing 2D video images, 2D video images may be reproduced by successively outputting either the left-eye video image or the right-eye video image twice.

The method may further include determining whether an interactive graphics stream is a pop-up interactive graphics stream. The operation of reproducing 2D video images may include reproducing 2D video images in response to it being determined that the interactive graphics stream is the pop-up interactive graphics stream.

The method may further include reproducing 3D graphic images by generating left-eye graphic images and right-eye graphic images from an interactive graphics stream in response to the first command for activating the pop-up interactive graphics stream.

The interactive graphics stream may be a stereoscopic interactive graphics stream including a left-eye interactive graphics stream and a right-eye interactive graphics stream, and the operation of reproducing 3D graphic images may include generating the left-eye graphic images from the left-eye interactive graphics stream, and generating the right-eye graphic images from the right-eye interactive graphics stream.

The operation of reproducing 3D graphic images may include generating a graphic image by decoding the interactive graphics stream, and generating the left-eye graphic image and the right-eye graphic image by shifting the generated graphic image to the left or to the right based on a graphic plane offset value.

The operation of reproducing 3D graphic images may include generating the left-eye graphic images and the right-eye graphic images, such that an individual depth value is given to each of a plurality of graphic objects.

The operation of reproducing 3D graphic images may include generating the left-eye graphic images and the right-eye graphic images, such that the same depth value is given to each of the entire 3D graphic images.

The 2D images may include a graphic image, text, or any combination thereof.

The reproducing of the 3D video images may include filling in color by a graphics controller.

As another aspect, a video image processing apparatus is provided. The video image processing apparatus may include a video processing unit configured to reproduce 3-dimensional (3D) video images by generating left-eye video images and right-eye video images from a video stream and, in response to a first command for activating a pop-up interactive graphics stream being received, configured to reproduce 2-dimensional (2D) video images by generating either left-eye video images or right-eye video images from the video stream.

In response to the video processing unit receiving a second command for deactivating the pop-up interactive graphics stream, the video processing unit may reproduce 3D video images by generating left-eye video images and right-eye video images from the video stream.

The video processing unit may include a video decoder configured to generate left-eye video images, right-eye video images, or a combination thereof from the video stream, an output unit configured to reproduce video images generated by the video decoder, and a switching unit configured to control the video decoder to generate both of the left-eye video images and the right-eye video images or either the left-eye video images or the right-eye video images, in response to the switching unit receiving the first command for activating the pop-up interactive graphics stream, the switching unit may control the video decoder to generate left-eye video images or right-eye video images.

In a case where the video decoder generates both the left-eye video images and right-eye video images, the output unit may reproduce 3D video images by alternately outputting the left-eye video images and the right-eye video images, and in a case where the video decoder generates either the left-eye video images or right-eye video images, the output unit may reproduce 2D video images by successively outputting either the left-eye video image or the right-eye video image twice.

The video image processing apparatus may further include a graphics decoder configured to receive the first command for activating a pop-up interactive graphics stream and notifies reception thereof to the switching unit.

The graphics decoder may decode an interactive graphics stream, determine whether an interactive graphics stream is a pop-up interactive graphics stream to be activated by a UOP from a user, and, in response to it being determined that the interactive graphics stream is the pop-up interactive graphics stream, notify reception of the first command to the switching unit.

The graphics decoder may generate left-eye graphic images and right-eye graphic images from the interactive graphics stream in response to the first command for activating the pop-up interactive graphics stream, and the output unit may reproduce 3D graphic images by alternately outputting the left-eye graphic images and the right-eye graphic images.

The interactive graphics stream may be a stereoscopic interactive graphics stream including a left-eye interactive graphics stream and a right-eye interactive graphics stream, and the graphics decoder may generate the left-eye graphic images from the left-eye interactive graphics stream and generate the right-eye graphic images from the right-eye interactive graphics stream.

The graphics decoder may generate the left-eye graphic image and the right-eye graphic image by generating a graphic image by decoding the interactive graphics stream and shifting the generated graphic image to the left or to the right by a graphic plane offset value.

The graphics decoder may generate the left-eye graphic images and the right-eye graphic images, such that an individual depth value is given to each of a plurality of graphic objects.

The video decoder may generate the left-eye graphic images and the right-eye graphic images, such that the same depth value is given to the entire 3D graphic image.

In another aspect, a non-transitory computer-readable recording medium having recorded thereon a computer program for implementing a method of processing video images is provided. The method includes reproducing 3-dimensional (3D) video images by generating left-eye video images and right-eye video images from a video stream, receiving a first command for activating a pop-up interactive graphics stream during the reproduction of the 3D video images, and reproducing 2-dimensional (2D) video images by generating either left-eye video images or right-eye video images from the video stream, in response to the first command for activating the pop-up interactive graphics stream.

In another aspect, a device is provided. The device includes a video image processing apparatus including a video processing unit configured to reproduce 3-dimensional (3D) video images by generating left-eye video images and right-eye video images from a video stream and, in response to receiving a command for activating a pop-up interactive graphics stream, configured to reproduce 2-dimensional (2D) video images by generating either left-eye video images or right-eye video images from the video stream.

The device may further include an output unit configured to output the 3D video images and the 2D video images.

Other features and aspects may be apparent from the following detailed description, the drawings, and the claims.

Figure 1:
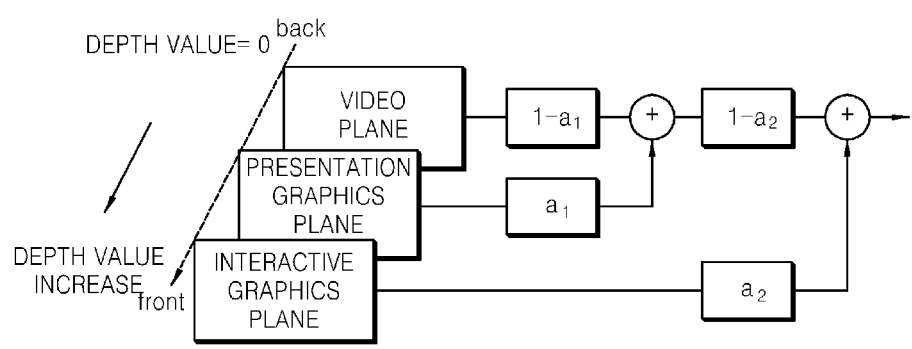
FIG. 1 is a diagram illustrating an example of a blending model for displaying video images and graphic images together.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating an example of a blending model for displaying video images and graphic images together. Video images generated from a video stream may be reproduced together with graphic images generated from a graphic stream. A graphics stream may include a presentation graphics stream, a text subtitle stream for displaying subtitles, an interactive graphics stream for providing a menu including buttons for interaction with a user, a graphical overlay displayed by a programming language such as Java, or any combination thereof.

In FIG. 1, a video image generated from a video stream is displayed on a video plane. A graphic image generated from a presentation graphics stream or a text subtitle stream is displayed on a presentation graphics plane, and a graphic image generated from an interactive graphics stream is displayed on an interactive graphics plane. Graphic images generated from a presentation graphics stream, a text subtitle stream, and an interactive graphics stream include graphic objects for indicating menus, buttons, or subtitles.

To reproduce video images and graphic images together while 3-dimensionally displaying the video images, the video images may have a depth impression at a greater depth than the graphic images. In a case where graphic images have a depth impression at a greater depth than the video images, the video images protrude more than the graphic images, and the graphic images are sunk into the video images, and thus, the video images and the graphic images may be displayed unnaturally. Accordingly, it may be desirable to have graphic images to be displayed with video images not interfere the depth of the video images.

In response to a graphic image for displaying subtitles and a graphic image for displaying a menu being reproduced together, the graphic image for displaying a menu may be displayed at a smaller depth than the graphic image for displaying subtitles.

To implement the reproduction as described, the blending model of FIG. 1 overlays video images and graphic images, such that the depths of video images increase from the interactive graphics plane to the video plane. In FIG. 1, the depth value of a video image becomes closer to 0 as the video image moves backward, and the depth value of a video image increases as the video image moves frontward are assumed. As a depth value of a video image becomes closer to 0, the depth impression of the video image increases, and thus, a viewer gets a stereoscopic impression that the video image moves away from the viewer. As a depth value of a video image increases, a viewer gets a stereoscopic impression that the video image protrudes toward the viewer. In response to a video image being formed at a flat screen, the video image is 2-dimensionally reproduced, and thus, a viewer cannot get a stereoscopic impression In FIG. 1, the blending model overlays video images and graphic images, such that the depths of video images increase from the video plane to the interactive graphics plane to the video plane. In other words, the blending model overlays graphic images displayed by a presentation graphics stream or a text subtitle stream on video images and overlays graphic images displayed by an interactive graphics stream on the video images and subtitle images.

In FIGS. 1, a1 and a2 indicate transparency information, where a value of each of a1 and a2 is 0 or 1. In response to value of the transparency information being 0, it means opacity. In response to value of the transparency information being 1, it means transparency.

As described above, in a case where video images and graphic images are reproduced together, the graphic images may have greater depth than the video images. In other words, the graphic images may have depth impression at a greater depth than the video images. Accordingly, the video images and the graphic images may be reproduced naturally.

Figure 2:
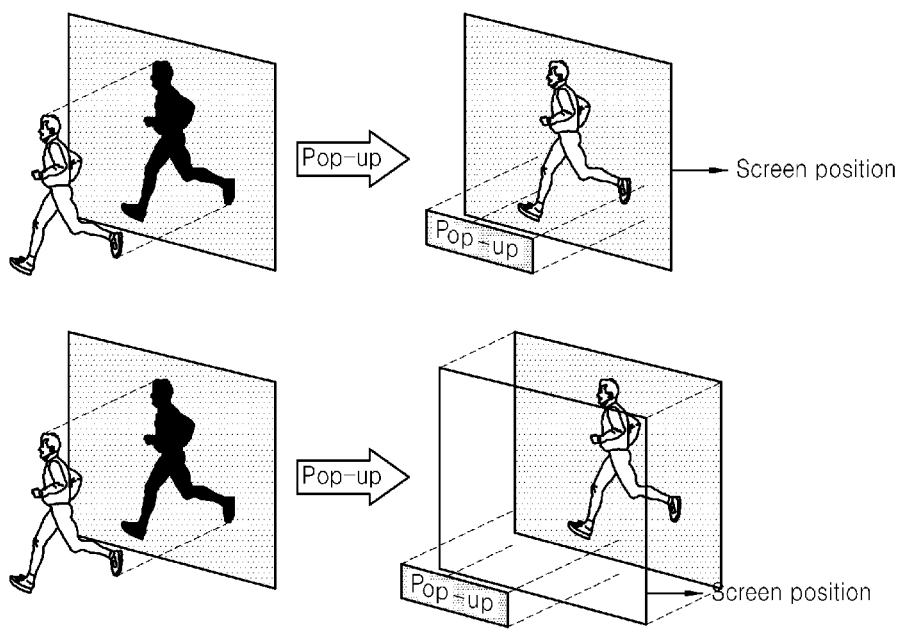
FIG. 2 is a diagram illustrating an example of the adjustment of depth values of video images and graphic images for natural reproduction of the video images and the graphic images in a case where the video images and the graphic images are reproduced together.

FIG. 2 is a diagram illustrating an example of the adjustment of depth values of video images and graphic images for natural reproduction of the video images and the graphic images in a case where the video images and the graphic images are reproduced together.

As described, in a case where video images and graphic images are reproduced together, the graphic images may have a greater depth value than the video images.

In a case of a presentation graphics stream or a text subtitle stream for displaying subtitles, time points to display graphic images are determined in advance. A depth value of the graphic images may be adjusted with reference to a depth value of video images, which are to be reproduced together with the graphic images, while an author authors the presentation graphics stream or the text subtitle stream, such that the depth value of the graphic images does not affect the depth value of the video images.

Interactive graphics streams for displaying menus may be two types of interactive graphics streams. One type of the interactive graphics streams is an always-on interactive graphics stream for displaying an always-on menu, which appears and disappears at predetermined time points, and the other type of the interactive graphics streams is a pop-up interactive graphics stream for displaying a pop-up menu, which may appear at predetermined time points and appears and disappears by a command user operation (UOP). In a case of the always-on menu which appears and disappears at predetermined time points, an author knows a depth value of video images to be displayed together with the menu, and thus, the author may adjust a depth value of graphic images during the authoring stage, so as not to affect the depth impression of the video images.

As another aspect, in a case of the pop-up menu, the pop-up menu appears and disappears in a screen image based on inputs of a user, and thus, an author may not know depth values of video images that are reproduced together while the pop-up menu is actually displayed. Depth values of graphic images may decrease to be less than depth values of video images.

In the example, the depth impression of video images is adjusted as shown in FIG. 2 to prevent depth values of graphic images from decreasing to be less than depth values of the video images while the video images and the graphic images are reproduced together.

The upper part of FIG. 2 is a diagram illustrating an example of video images that are 2-dimensionally reproduced in a case where a pop-up menu is reproduced by a UOP while the video images are being 3-dimensionally reproduced. The upper left part of FIG. 2 shows that the video images are 3-dimensionally reproduced. In a case where the pop-up menu and the video images are reproduced together according to a user request for activating the pop-up menu while the video images are being 3-dimensionally reproduced, the depth value of the video images reproduced together with the pop-up menu may be adjusted in the examples, such that the depth value of the video images becomes identical to a depth value of a screen image, that is, a depth value of a screen position. In response to the depth value of video images becoming substantially identical to the depth value of a screen position, the video images are formed on a screen image, and thus, the video images are 2-dimensionally reproduced. A depth value of a pop-up menu may be identical to or greater than a depth value of a screen position. In a case where video images are 2-dimensionally reproduced, the pop-up menu has a depth value larger than that of the video images, and thus, the video images and graphic images are naturally reproduced.

The lower part of FIG. 2 shows that, in response to a user requesting a pop-up menu to be displayed while video images are 3-dimensionally reproduced, the video images and the pop-up menu are reproduced together, such that the video images are formed at a greater depth than a screen image. A depth value of a pop-up menu may be substantially identical to or greater than a depth value of a screen position. In response to the depth value of video images decreasing to be less than the depth value of a screen position, the pop-up menu has a depth value greater than the depth value of the video images, and thus, the video images and graphic images are naturally reproduced.

Figure 3:
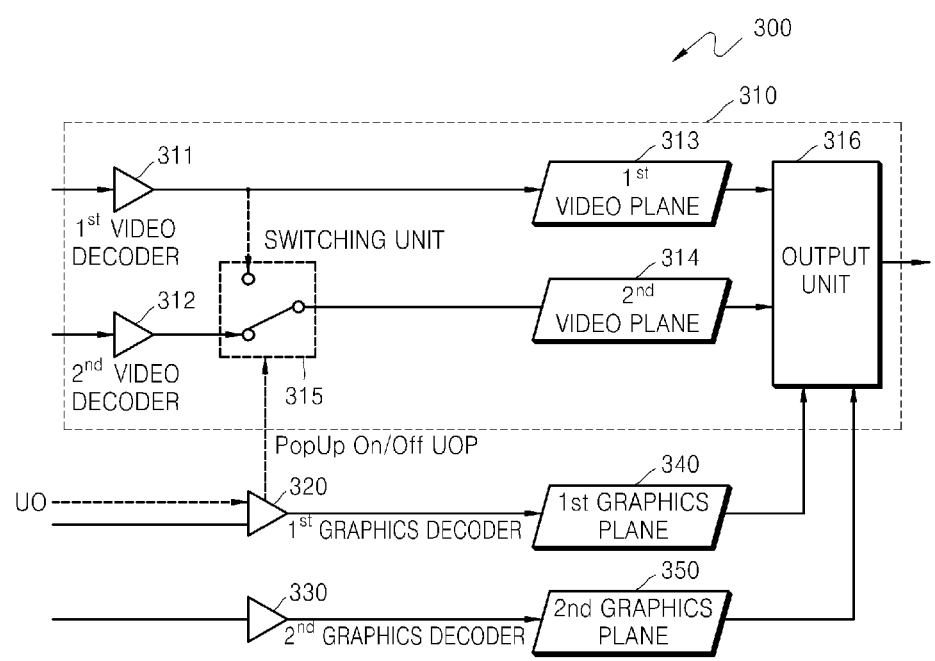
FIG. 3 is a diagram illustrating an example of a video image processing apparatus.
Figure 4:
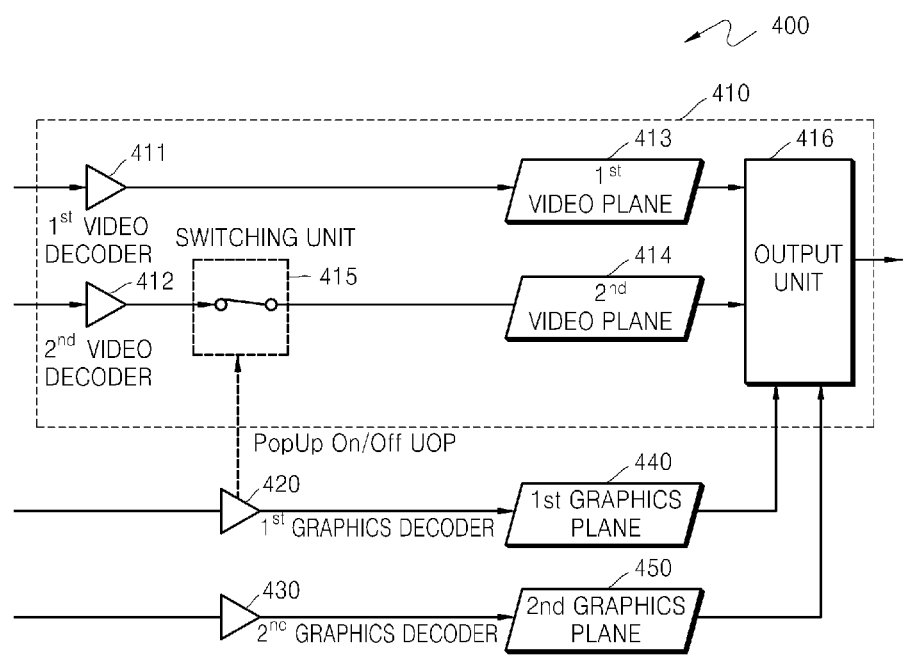
FIG. 4 is a diagram illustrating another example of a video image processing apparatus.
Figure 5:
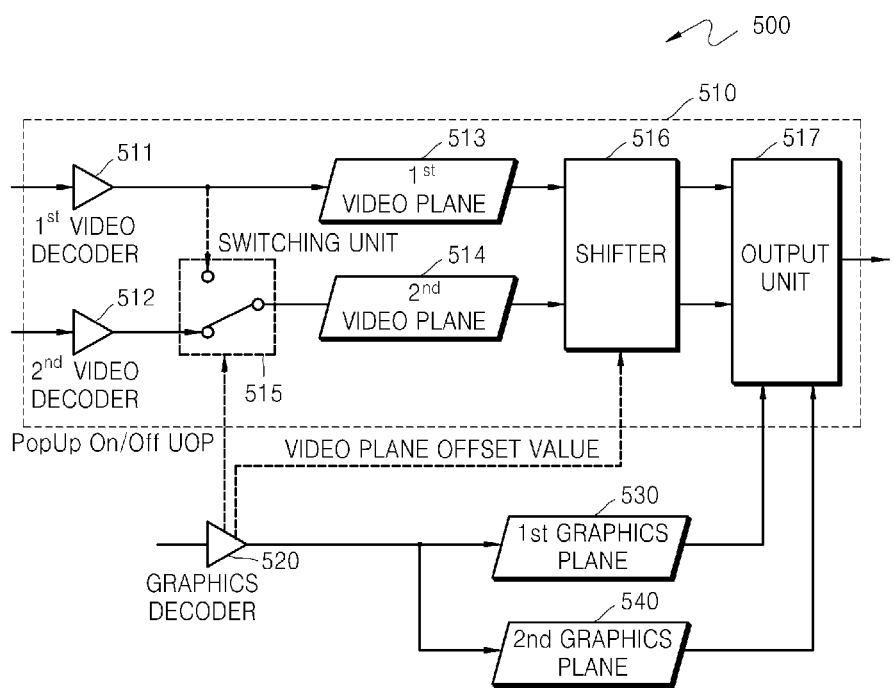
FIG. 5 is a diagram illustrating another example of a video image processing apparatus.

Video image processing apparatuses, as illustrated in FIGS. 3 through 5, may be implemented as video image processing apparatuses for processing video images to have the depth impression as illustrated in FIG. 2 in a case where the video images and a pop-up menu are reproduced together.

FIGS. 3 and 4 illustrate examples of video image processing apparatuses 300 and 400 for 2-dimensionally reproducing video images as shown in the upper part of FIG. 2 in a case where the video images and a pop-up menu are reproduced together.

Referring to FIG. 3, the example of the video image processing apparatus 300 includes a video processing unit 310, a first graphics decoder 320, a second graphics decoder 330, a first graphics plane 340, and a second graphics plane 350.

The video processing unit 310 includes a first video decoder 311, a second video decoder 312, a first video plane 313, a second video plane 314, a switching unit 315, and an output unit 316.

The first video decoder 311 receives one of a left-eye video stream and a right-eye video stream, and the second video decoder 311 receives the other one of the left-eye video stream and the right-eye video stream. Herein, the left-eye video stream is assumed to be input to the first video decoder 311 and the right-eye video stream is assumed to be input to the second video decoder 312, for convenience and conciseness.

The first video decoder 311 decodes the left-eye video stream and forms left-eye video images on the first video plane 313 by using the decoded left-eye video stream. The second video decoder 312 decodes the right-eye video stream and forms right-eye video images on the second video plane 314 by using the decoded right-eye video stream.

The first video plane 313 and the second video plane 314 temporarily store the left-eye video image and the right-eye video image formed by the first video decoder 311 and the second video decoder 312, respectively. The output unit 316 alternately outputs the video images formed on the first video plane 313 and the second video plane 314.

The first graphics decoder 320 and the second graphics decoder 330 decode graphics streams. In FIG. 3, an interactive graphics stream is assumed to be a stereoscopic interactive graphics stream including a left-eye interactive graphics stream and a right-eye interactive graphics stream. The first graphics decoder 320 decodes the left-eye interactive graphics stream and forms left-eye graphic images on the first graphics plane 340, whereas the second graphics decoder 320 decodes the right-eye interactive graphics stream and forms right-eye graphic images on the second graphics plane 350.

The first graphics plane 340 and the second graphics plane 350 temporarily store the left-eye graphic image and the right-eye graphic image formed by the first graphics decoder 320 and the second graphics decoder 330, respectively. The output unit 316 alternately outputs the graphic images formed on the first graphics plane 340 and the second graphics plane 350.

In a case where an interactive graphics stream is a stereoscopic interactive graphics stream, a left-eye interactive graphics stream and a right-eye interactive graphics stream may be generated, such that the graphics streams have individual depth values with respect to each of the graphic objects included in graphic images.

In response to a distance that each of the graphic objects in a graphic image should be shifted to the left or to the right for an individual depth value to be allocated to each of the graphic objects being referred to as an offset value with respect to each of the graphic objects, the graphic objects are respectively shifted to the left or to the right according to offset values with respect to the graphic objects in the left-eye graphic image and the right-eye graphic image formed on the first graphics plane 340 and the second graphics plane 350.

In this case, the left-eye graphic image and the right-eye graphic image respectively generated by the first graphics decoder 320 and the second graphics decoder 330 have individual depth values with respect to each of the graphic objects, and thus, 3D graphic images output by the output unit 316 have individual stereoscopic impressions with respect to each of the graphic objects.

The video image processing apparatus 300 may receive a UOP via a user interface (not shown). While watching 3D video images, a user may issue a command for displaying a pop-up menu and/or a command for terminating the display of a pop-up menu to the video image processing apparatus 300. Herein, from among various UOPs, a UOP for displaying a pop-up menu will be referred to as a pop-up interactive graphics stream activating UOP (PopUp On UOP), whereas a UOP for terminating display of a pop-up menu will be referred to as a pop-up interactive graphics stream deactivating UOP (PopUp Off UOP).

The PopUp On/Off UOPs are transmitted to one or more of the first graphics decoder 320 and the second graphics decoder 330 via the user interface. Herein, the PopUp On/Off UOPs are assumed to be transmitted to the first graphics decoder 320 for convenience and conciseness.

The first graphics decoder 320, which has received the PopUp On/Off UOPs, transmits the PopUp On/Off UOPs to the second graphics decoder 330. Furthermore, the first graphics decoder 320 transmits the PopUp On/Off UOPs to the switching unit 315. In response to the switching unit 315 receiving the PopUp On/Off UOPs from the first graphics decoder 320, the switching unit 315 controls the video processing unit 310, such that the second video decoder 312 forms right-eye video images on the second video plane 314 or the first video decoder 311 forms left-eye video images on the first video plane 313.

In response to the first graphics decoder 320 receiving a PopUp ON UOP from a user while the video processing unit 310 generate left-eye video images and right-eye video images respectively on the first video plane 313 and the second video plane 314 and reproduces 3D video images, the first graphics decoder 320 transmits the PopUp On UOP to the second graphics decoder 330. In response to the PopUp On UOP from the user, the first graphics decoder 320 and the second graphics decoder 330 respectively decode a left-eye interactive graphics stream and a right-eye interactive graphics stream and respectively form left-eye graphic images and right-eye graphic images on the first graphics plane 340 and the second graphics plane 350. The output unit 316 reproduces 3D graphic images by alternately outputting the left-eye graphic images and the right-eye graphic images formed on the first graphics plane 340 and the second graphics plane 350.

Furthermore, the first graphics decoder 320 transmits the PopUp On UOP from the user to the switching unit 315. The switching unit 315 controls the video processing unit 310 to reproduce 2D video images by generating either left-eye video images or right-eye video images. The switching unit 315 controls the first video decoder 311, not the second video decoder 312, to form left-eye video images on the second video plane 314. Since the first video decoder 311 generates left-eye video images from a left-eye video stream, left-eye video images are formed on the second video plane 314 by the first video decoder 311.

As a non-limiting example, FIG. 3 shows that the switching unit 315 controls whether the first video decoder 311 forms video images on the second video plane 314 or the second video decoder 312 forms video images on the second video plane 314. As another example, the switching unit 315 may also control, such that right-eye video images are formed on the second video plane 314 and either the first video decoder 311 forms video images on the first video plane 313 or the second video decoder 312 forms video images on the first video plane 313.

The output unit 316 alternately outputs video images formed on the first video plane 313 and the second video plane 314. Since the left-eye video images are formed on both of the first video plane 313 and the second video plane 314, the output unit 316 reproduces 2D video images by successively reproducing the left-eye video images twice. The output unit 316 overlays 3D graphic images on the 2D video images and reproduces the 3D graphic images and the 2D video images.

A depth value of a pop-up menu may be equal to or greater than a depth value of a video image, and thus, in a case where video images are 2-dimensionally reproduced, a pop-up menu reproduced as 3D graphic images has a depth value greater than that of the video images, and thus, the video images and the graphic images are naturally reproduced.

While the video processing unit 310 is reproducing 2D video images, in response to a user transmitting a PopUp Off UOP via the user interface, the first graphics decoder 320 and the second graphics decoder 330 finish forming the left-eye graphic images and the right-eye graphic images on the first graphics plane 340 and the second graphics plane 350, respectively, by using the pop-up interactive graphics stream.

The first graphics decoder 320 also transmits the PopUp Off UOP to the switching unit 315. The switching unit 315 receives the PopUp Off UOP from the first graphics decoder 320 and controls the second video decoder 312, not the first video decoder 311, to form video images on the second video plane 314. Under the control of the switching unit 315, the second video decoder 312 forms right-eye video images on the second video plane 314.

The output unit 316 reproduces 3D video images by alternately outputting the left-eye video images formed on the first video plane 313 and the right-eye video images formed on the second video plane 314.

Prior to transmission of a PopUp On/Off UOP from a user to the switching unit 315, the first graphics decoder 320 determines whether an interactive graphics stream to be processed is a pop-up interactive graphics stream for displaying a pop-up menu and, in response to the interactive graphics stream being a pop-up interactive graphics stream, may transmit the PopUp On/Off UOP from the user to the switching unit 315. To determine whether an interactive graphics stream is a pop-up interactive graphics stream, the first graphics decoder 320 may analyze a User Interface Model field included in an ICS Interactive Composition Segment of an interactive graphics stream and determine whether the interactive graphics stream to be output is a pop-up interactive graphics stream. In response to the interactive graphics stream being a pop-up interactive graphics stream, the first graphics decoder 320 transmits the PopUp On/Off UOP from the user to the switching unit 315.

As described, in response to the example of the video image processing apparatus receiving a UOP for activating a pop-up interactive graphics stream during reproduction of 3D video images, the video image processing apparatus may reproduce 2D video images by forming either left-eye video images or right-eye video images on both of a first video plane and a second video plane.

FIG. 4 is a diagram illustrating another example of the video image processing apparatus 400. Referring to FIG. 4, the video image processing apparatus 400 includes a video processing unit 410, a first graphics decoder 420, a second graphics decoder 430, a first graphics plane 440, and a second graphics plane 450.

The video processing unit 410 includes a first video decoder 411, a second video decoder 412, a first video plane 413, a second video plane 414, a switching unit 415, and an output unit 416.

Components of the video image processing apparatus 400 of FIG. 4 are substantially identical to the components of the video image processing apparatus 300 of FIG. 3 except for the switching unit 415, and thus, descriptions thereof are omitted for conciseness.

The switching unit 314 of the video image processing apparatus 300 of FIG. 3 is different from the switching unit 415 of the video image processing apparatus 400 which controls the second video decoder 412 to form video images on the second video plane 414 or not to form video images on the second video plane 414.

While the video processing unit 410 is reproducing 3D video images by respectively forming left-eye video images and right-eye video images on the first video plane 413 and second video plane 414, in response to the first graphics decoder 420 receiving a PopUp On UOP from a user, the first graphics decoder 420 transmits the PopUp On UOP to the second graphics decoder 430. The first graphics decoder 420 and the second graphics decoder 430 respectively decode a left-eye interactive graphics stream and a right-eye interactive graphics stream and respectively form left-eye graphic images and right-eye graphic images on the first graphics plane 440 and the second graphics plane 450. The output unit 416 reproduces 3D graphic images by alternately outputting the left-eye graphic images and the right-eye graphic images respectively formed on the first graphics plane 440 and the second graphics plane 450.

Furthermore, in response to the first graphics decoder 420 receiving a PopUp On UOP from a user, the first graphics decoder 420 transmits the PopUp On UOP to the switching unit 415. In response to the switching unit 415 receiving the PopUp On UOP, the switching unit 415 controls the second video decoder 412 so as to not form video images on the second video plane 414. As a non-limiting example, FIG. 4 shows that the switching unit 415 controls the second video decoder 412 to form video images on the second video plane 414 or controls the second video decoder 412 not to form video images on the second video plane 414. As another example, the switching unit 415 may also control the second video decoder 412, such that right-eye video images are formed on the second video plane 414 and either the first video decoder 411 forms video images on the first video plane 413 or the first video decoder 411 does not form video images on the first video plane 413.

The output unit 416 alternately outputs video images formed on the first video plane 413 and the second video plane 414. Under the control of the switching unit 415, video images are not formed on the second video plane 414, and thus, the output unit 416 reproduces the left-eye video images formed on the first video plane 413 and reproduces blank video images on the second video plane 414. For example, the blank video images are entirely black or entirely white video images. In this case, video images reproduced by the output unit 416 are 2D video images.

While the video processing unit 410 is reproducing 2D video images, in response to a user transmitting a PopUp Off UOP via a user interface, the first graphics decoder 420 and the second graphics decoder 430 finish forming the left-eye graphic images and the right-eye graphic images on the first graphics plane 440 and the second graphics plane 450, respectively, by using the pop-up interactive graphics stream.

The first graphics decoder 420 also transmits the PopUp Off UOP to the switching unit 415. The switching unit 415 receives the PopUp Off UOP from the first graphics decoder 420 and controls the second video decoder 412 to form video images on the second video plane 414. The second video decoder 412 decodes a right-eye video stream and forms right-eye video images on the second video plane 414 under the control of the switching unit 415. The output unit 416 reproduces 3D video images by alternately outputting the left-eye video images formed on the first video plane 413 and the right-eye video images formed on the second video plane 414.

As described, in response to a video image processing apparatus receiving a UOP for activating a pop-up interactive graphics stream during reproduction of 3D video images, the video image processing apparatus may reproduce 2D video images by controlling the video processing unit 410 to form or not to form either left-eye video images or right-eye video images on one of the first video plane and second video plane.

FIG. 5 is a diagram illustrating another example of a video image processing apparatus 500. As an example, FIG. 5 shows a video image processing apparatus for reproducing a pop-up menu and video images together with a stereoscopic impression that, as shown in the lower part of FIG. 2, the video images are located deeper than the pop-up menu.

Referring to FIG. 5, the video image processing apparatus 500 includes a video processing unit 510, a graphics decoder 520, a first graphics plane 530, and a second graphics plane 540.

The video processing unit 510 includes a first video decoder 511, a second video decoder 512, a first video plane 513, a second video plane 514, a switching unit 515, a shifter 516, and an output unit 517.

To implement the video image processing apparatus 500 of FIG. 5, particular depth values of a video plane in response to a pop-up menu being displayed may be defined. Information for a video plane to have particular depth values may be included in a memory (not shown) within the video image processing apparatus 500, in a video stream, in a graphics stream, or in metadata with respect to a video stream. Herein, information for a video plane to have particular depth values will be referred to as a video plane offset value, which is information indicating a distance by which left-eye video images or right-eye video images are shifted to the left or to the right.

In response to the graphics decoder receiving a PopUp On UOP from a user while the video processing unit 510 is reproducing 3D video images by generating left-eye video images and right-eye video images, the graphics decoder 520 determines whether an interactive graphics stream to be processed is a pop-up interactive graphics stream for displaying a pop-up menu and, in response to the interactive graphics stream being a pop-up interactive graphics stream, transmits the PopUp On UOP from the user to the switching unit 515.

In response to the switching unit 515 receiving the PopUp On UOP from the graphics decoder 520, the switching unit 515 controls the first video decoder 511, not the second video decoder 512, to form video images on the second video plane 514. In this case, left-eye video images are formed on both the first video plane 513 and the second video plane 514.

Furthermore, in response to the graphics decoder 520 of the video image processing apparatus 500 of FIG. 5 receiving a PopUp On UOP, the graphics decoder 520 extracts video plane offset values from a memory (not shown) in the video image processing apparatus 500, a video stream, a graphics stream, or metadata with respect to a video stream. The graphics decoder 520 transmits an extracted video plane offset value to the shifter 516.

The shifter 516 shifts video images formed on the first video plane 513 and the second video plane 514 to the left and to the right based on the video plane offset values, respectively. In response to a video plane offset value being a positive value, the shifter 516 generates two new video images by shifting left-eye video images formed on the first video plane 513 to the left by the video plane offset value and shifting right-eye video images formed on the second video plane 514 to the right by the video plane offset value.

The output unit 517 alternately outputs the two video images generated by the shifter 516. In this case, video images reproduced by the output unit 517 are 3D video images having the same depth value. As distances by which the shifter 516 shifts left-eye video images to the left and to the right increase, that is, as video plane offset values increase, depth values of 3D video images formed by two video images generated by the shifter 516 decrease, thus giving a stereoscopic impression that the 3D video images are located deeper.

In response to the graphics decoder 520 receiving a PopUp On UOP from a user, the graphics decoder 520 decodes an interactive graphics stream and generates graphic images. In FIG. 5, a graphics stream is assumed to be not a stereoscopic graphics stream.

Information for 3-dimensionally reproducing a graphics stream may be included in the memory in the video image processing apparatus 500, in a graphics stream, or in metadata with respect to a graphics stream. The video image processing apparatus 500 may extract information for 3-dimensionally reproducing a graphics stream from the memory, the graphics stream, or the metadata with respect to the graphics stream and may reproduce 3D graphic images from a graphics stream by using the information for 3-dimensionally reproducing a graphics stream. The information for 3-dimensionally reproducing a graphics stream may include graphic object offset information, graphic plane offset information, or any combination thereof. The graphic plane offset information is information for giving the same depth value to a graphic image including a plurality of graphic objects, whereas the graphic object offset information is information for giving an individual depth value to each of a plurality of graphic objects included in a graphic image.

The graphic plane offset information includes offset values with respect to a graphic plane. The offset values with respect to a graphic plane are values indicating distances by which a single graphic image generated by decoding a single graphics stream is shifted to the left and to the right for generating a 3D graphic image having the same depth value overall.

The graphic object offset information includes object identifiers for identifying each of a plurality of graphic objects included in a graphic image and offset values with respect to graphic objects that are to be applied to identified objects. The offset values with respect to the graphic objects are values indicating that the corresponding graphic objects are to be shifted to the left and to the right, such that each of the graphic objects has an individual depth value.

The graphics decoder 520 extracts information for 3-dimensionally reproducing a graphics stream from the memory in the video image processing apparatus 500, the graphics stream, or metadata with respect to the graphics stream and may 3-dimensionally reproduce a graphic image by giving the same depth value to an entire graphic image or giving an individual depth value to each of the graphic objects included in the graphic image, that is, each of the menus or buttons, by extracting graphic object offset information or graphic plane offset information from the information for 3-dimensionally reproducing a graphics stream.

In a case where the graphics decoder 520 extracts the graphic plane offset information from the information for 3-dimensionally reproducing a graphics stream, the graphics decoder 520 shifts the entire graphic image by offset values with respect to a graphic plane included in the graphic plane offset information and forms a left-eye graphic image and a right-eye graphic image on the first graphics plane 530 and the second graphics plane 540, respectively.

The output unit 517 may reproduce 3D graphic images by alternately outputting the left-eye graphic images and the right-eye graphic images respectively formed on the first graphics plane 530 and the second graphics plane 540. In this case, an entire 3D graphic image has the same depth value.

In a case where the graphics decoder 520 extracts the graphic object offset information from the information for 3-dimensionally reproducing a graphics stream, the graphics decoder 520 extracts graphic object identifiers from the graphic object offset information and gives an individual depth value to each of the identified graphic objects. In this case, the graphics decoder 520 respectively forms left-eye graphic images and right-eye graphic images on the first graphics plane 340 and the second graphics plane 350, respectively, by using offset values with respect to the graphic objects which indicate distances by which the corresponding graphic objects are shifted to the left and the other corresponding graphic objects are shifted to the right, such that each of the graphic objects is shifted to the left or to the right by the corresponding offset value.

In this case, each of the graphic objects in a 3D graphic image output by the output unit 517 has a separate stereoscopic impression.

In response to a user transmitting a PopUp Off UOP via a user interface, the graphics decoder 520 finishes forming graphic images by using a pop-up interactive graphics stream.

The graphics decoder 520 also transmits the PopUp Off UOP to the switching unit 515. The switching unit 515 receives the PopUp Off UOP from the graphics decoder 520 and controls the second video decoder 512 to form video images on the second video plane 514.

Furthermore, in response to the graphics decoder 520 receiving the PopUp Off UOP, the graphics decoder 520 notifies reception of the PopUp Off UOP to the shifter 516, so that the shifter 516 does not generate a new graphic image by shifting video images formed on the first video plane 513 and the second video plane 514 to the left or to the right.

The output unit 517 reproduces 3D video images by alternately outputting left-eye video images formed on the first video plane 513 and right-eye video images formed on the second video plane 514.

Figure 6:
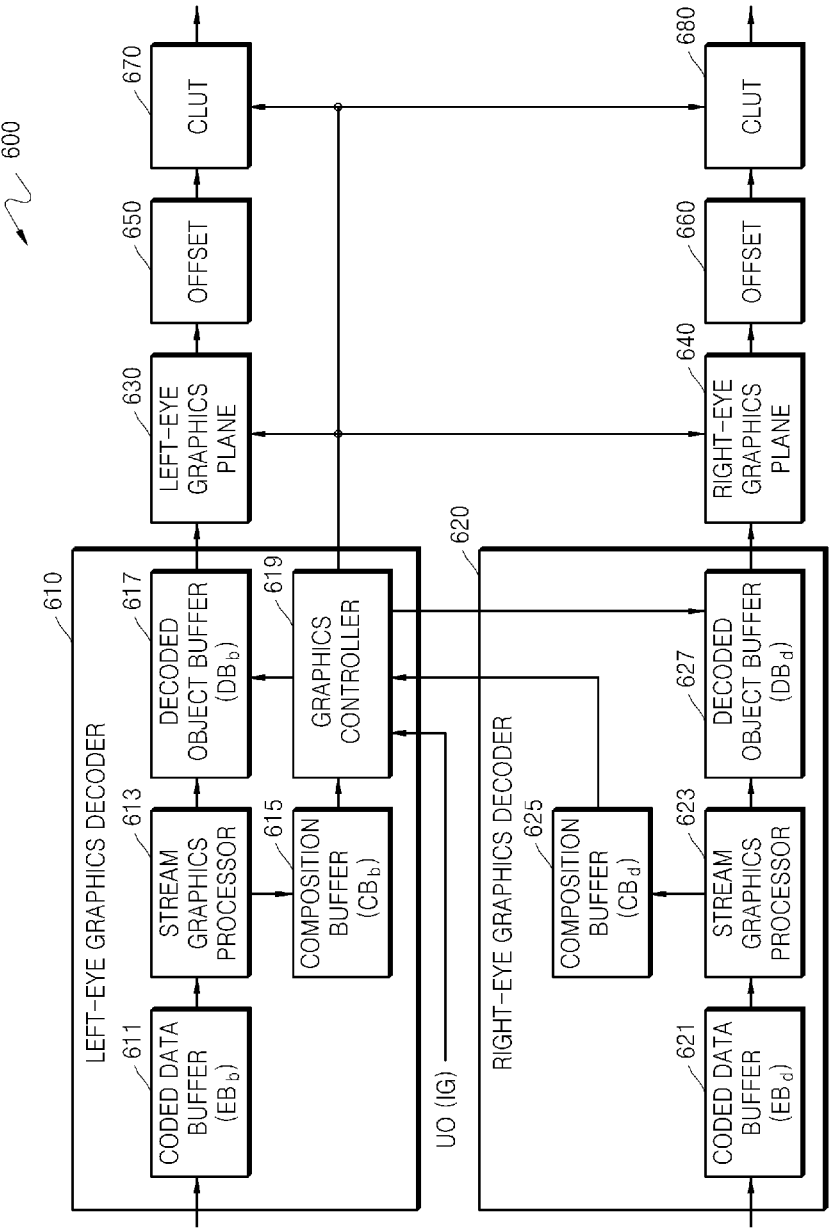
FIG. 6 is a diagram illustrating an example of a graphics decoding apparatus.

FIG. 6 is a diagram illustrating an example of a graphics decoding apparatus 600. Referring to FIG. 6, the graphics decoding apparatus 600 includes a left-eye graphics decoder 610, a right-eye graphics decoder 620, a left-eye graphics plane 630, a right-eye graphics plane 640, offset value applying units (referred to hereinafter as an 'offset') 650 and 660, and a color look-up tables (CLUTs) 670 and 680.

The left-eye graphics decoder 610 includes a coded data buffer 611, a stream graphics processor 613, a composition buffer 615, a decoded object buffer 617, and a graphics controller 619.

The right-eye graphics decoder 620 includes a coded data buffer 621, a stream graphic processor 623, a composition buffer 625, and a decoded object buffer 627.

In a case where a graphics stream is a stereoscopic graphics stream, the left-eye graphics decoder 610 decodes a left-eye graphics stream, whereas the right-eye graphics decoder 620 decodes a right-eye graphics stream. As another example, the coded data buffers 611 and 621 temporarily store the left-eye interactive graphics stream and the right-eye interactive graphics stream, respectively, and transmit the left-eye interactive graphics stream and the right-eye interactive graphics stream to the stream graphic processor 613 and 623, respectively. The stream graphic processor 613 and 623 respectively decode the left-eye interactive graphics stream and the right-eye interactive graphics stream, transmit button image object data to the decoded object buffers 617 and 627, and transmit button configuration information to the composition buffers 615 and 625.

The graphics controller 619 forms images to be output with respect to each object data transmitted to the decoded object buffers 617 and 627 by referring to the corresponding configuration information and transmits the formed images respectively to the left-eye graphics plane 630 and the right-eye graphics plane 640.

The graphics controller 619 fills colors of the images transmitted to the left-eye graphics plane 630 and right-eye graphics plane 640 by referring to the CLUTs 670 and 680, according to color information included in the corresponding configuration information. An output unit (not shown) displays 3D graphic images by alternately outputting images formed on the left-eye graphics plane 630 and the right-eye graphics plane 640. In this example, each of the graphic objects in a 3D graphic image may have an individual depth value.

In a case where a graphics stream is a stereoscopic graphics stream, the offset value applying units 650 and 660 perform no functions.

In a case where a graphics stream is not a stereoscopic graphics stream, the graphics decoding apparatus 600 may not use both the left-eye graphics decoder 610 and the right-eye graphics decoder 620, and thus, the graphics decoding apparatus 600 decodes a graphics stream by using a single graphics decoder, for example, the left-eye graphics decoder 610. The left-eye graphics decoder 610 forms images to be output by decoding the graphics stream, finds the formed images from the decoded object buffer 617, and transmits the images to the left-eye graphics plane 630 and the right-eye graphics plane 640.

The graphics controller 619 extracts information for 3-dimensionally reproducing a graphics stream from a memory (not shown) in a video image processing apparatus, the graphics stream, or metadata with respect to the graphics stream. The information for 3-dimensionally reproducing a graphics stream may include graphic object offset information, graphic plane offset information, or any combination thereof. To give the same depth value to an entire graphic image, the graphics controller 619 may extract graphic plane offset information, extract offset values with respect to a graphic plane, and transmit the offset values to the offset value applying units 650 and 660. In this case, the offset value applying units 650 and 660 receive offset values with respect to a graphic plane from the graphics controller 619 and shift images transmitted to the left-eye graphics plane 630 and the right-eye graphics plane 640 to the left and to the right, or to the right and to the left by the offset values with respect to the graphic plane. According to color information included in corresponding configuration information, the graphics controller 619 refers to the CLUTs 670 and 680 and fills colors of the images transmitted to the left-eye graphics plane 630 and the right-eye graphics plane 640. An output unit reproduces 3D graphic images by alternately outputting the images formed in the left-eye graphics plane 630 and the right-eye graphics plane 640. In this case, graphic images reproduced by the output unit 517 are 3D graphic images having the same depth value.

For the graphics controller 619 to give an individual depth value to each of the graphic objects included in a graphic image, the graphics controller 619 extracts graphic object offset information from the information for 3-dimensionally reproducing a graphics stream, extracts object identifiers and offset values with respect to graphic objects from the graphic object offset information, and transmits the object identifiers and the offset values to the offset value applying units 650 and 660. The offset value applying units 650 and 660 receive the object identifiers and the offset values with respect to graphic objects from the graphics controller 619 and shift each of the graphic objects included in images transmitted to the left-eye graphics plane 630 and the right-eye graphics plane 640 to the left and to the right or to the right and to the left by the offset values with respect to the graphic plane. According to color information included in corresponding configuration information, the graphics controller 619 refers to the CLUTs 670 and 680 and fills colors of the images transmitted to the left-eye graphics plane 630 and the right-eye graphics plane 640. The output unit 517 reproduces 3D graphic images by alternately outputting the images formed in the left-eye graphics plane 630 and the right-eye graphics plane 640. In this case, graphic images reproduced by the output unit 517 are 3D graphic images having the same depth value. An output unit reproduces 3D graphic images by alternately outputting the images formed in the left-eye graphics plane 630 and the right-eye graphics plane 640. In this case, a graphic image reproduced by the output unit is a 3D graphic image in which an individual depth value is given to each of the graphic objects included in the graphic image.

The graphics controller 619 receives a UOP from a user via a user interface. The graphics controller 619 controls the graphics decoding apparatus 600 according to the UOP from the user. In a case where the graphics controller 619 receives a PopUp On/FF UOP via the user interface, the graphics controller 619 analyzes a User Interface Model field included in an ICS Interactive Composition Segment of an interactive graphics stream and determines whether a decoded interactive graphics stream is a pop-up interactive graphics stream. In a case where it is determined that the decoded interactive graphics stream is a pop-up interactive graphics stream, the graphics controller 619 transmits the PopUp On/Off UOP to a video processing unit (not shown). In response to the video processing unit receiving a PopUp On UOP from the graphics controller 619, the video processing unit may reproduce 2D video images by forming either left-eye video images or right-eye video images or may reproduce 3D video images having a depth value smaller than that of a pop-up menu by generating two new video images by shifting one of left-eye video images and right-eye video images to the left and to the right by video plane offset values.

In response to the video processing unit receiving a PopUP Off UOP from the graphics controller 619 while the video processing unit is reproducing 2D video images, the video processing unit may generate both left-eye video images and right-eye video images, so that 3D video images may be reproduced. As described above, the video plane offset values may be included in a memory (not shown) in a video image processing apparatus, in a video stream, in a graphics stream, or in metadata with respect to a video stream.

As described, an example of a graphics decoding apparatus may generate a 3D graphic image having the same depth value overall or a 3D graphic image in which an individual depth value is given to each graphic object included in the 3D graphic image by using a graphics stream.

Figure 7:
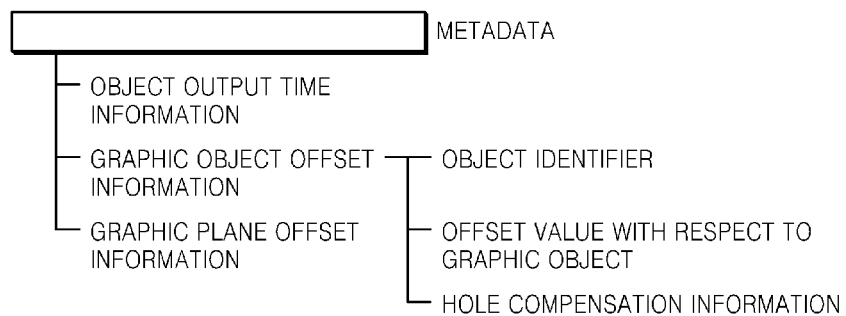
FIG. 7 is a diagram illustrating an example of metadata with respect to a graphics stream.

FIG. 7 is a diagram illustrating an example of metadata with respect to a graphics stream. The metadata includes information for 3-dimensionally reproducing a graphics stream. As another aspect, in a non-limiting example, the information for 3-dimensionally reproducing a graphics stream may also be included in a memory, in a video image processing apparatus, or in a graphics stream.

The metadata with respect to a graphics stream may include graphic object output time information indicating time points for outputting graphic objects included in the graphics stream and the graphic object offset information. A graphic object may correspond to a button or a subtitle included in a graphic image displayed by the graphics stream. The graphic object output time information indicates time points for outputting a menu or a subtitle, that is, a graphic object, and may be indicated as a presentation time stamp (PTS) value, such as ICS, PCS, and DPS.

A graphic image displayed by a graphics stream includes one or more graphic objects for displaying a menu, a button, a subtitle, etc. The metadata with respect to a graphics stream may include graphic object offset information for giving an individual depth value to each graphic object included in a graphic image, a graphic plane offset information, or any combination thereof for giving the same depth value to an entire graphic image.

The graphic object offset information may include object identifiers for identifying graphic objects, offset values with respect to the graphic objects, and hole compensation information. The object identifiers are information for identifying particular graphic objects from among graphic objects generated by decoding a graphics stream.

The offset values with respect to graphic objects may indicate distances by which objects identified by the object identifiers are shifted to the left or to the right.

The hole compensation information is information for compensating for a hole formed at an original location of a graphic object in response to the graphic object being shifted by an offset value with respect to the graphic object and may include hole region identification information for identifying a hole region and color reference information indicating a color for filling the identified region. The hole compensation information may include information regarding a picture to be inserted to a hole region, instead of color reference information.

Figure 8:
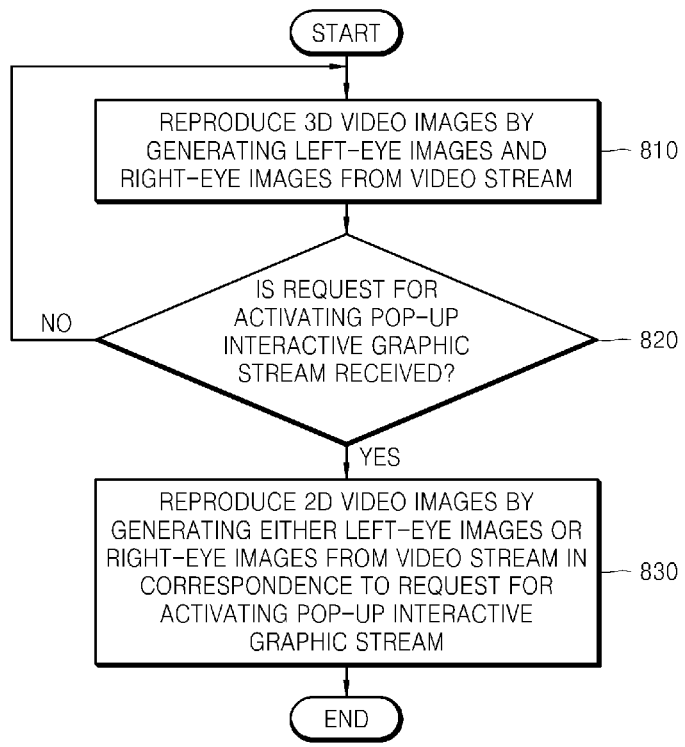
FIG. 8 is a flowchart illustrating an example of a method of processing video images.

FIG. 8 is a flowchart illustrating an example of a method of processing video images. Referring to FIG. 8, a video image processing apparatus reproduces 3D video images by generating left-eye video images and right-eye video images from a video stream (operation 810).

In response to the video image processing apparatus receiving a request or a command for activating a pop-up interactive graphics stream during playback of the 3D video images (operation 820), the video image processing apparatus determines whether a decoded interactive graphics stream is pop-up interactive graphics stream to be activated according to the request. The request or command may correspond to UOIP from the user.

If the decoded interactive graphics stream is a pop-up interactive graphics stream to be activated according to the UOP from the user, the video image processing apparatus generates either left-eye video images or right-eye video images from the video stream and reproduces 2D video images (operation 830).

As one aspect, the description provides a method and apparatus for processing video images for 2-dimensionally reproducing video images in a case where reproduction of video images and a pop-up menu together may occur during reproduction of 3-dimensional video images.

As another aspect, the description also provides a method and apparatus for processing video images for 3-dimensionally reproducing video images in a case where reproduction of video images and a pop-up menu together may occur during reproduction of 3-dimensional video images, such that the video images are reproduced at a greater depth than the pop-up menu. According to the examples, video images may be 2-dimensionally reproduced in a case where reproduction of video images and a pop-up menu together may occur during reproduction of 3-dimensional video images. Furthermore, video images may be 3-dimensionally reproduced in a case where reproduction of video images and a pop-up menu together may occur during reproduction of 3-dimensional video images, such that the video images are reproduced at a greater depth than the pop-up menu.

An example of a device including a video image processing apparatus includes a video game machine, a computer, a video disc player, etc.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method, executed by a video image processing apparatus, of processing a video stream, the method comprising:
    outputting first eye video images using a first eye video decoder;
    outputting second eye video images using a second eye video decoder;
    outputting first eye graphic images using a first graphic plane;
    outputting second eye graphic images using a second graphic plane;
    receiving a first command for activating a pop-up interactive graphics stream while outputting the first eye video images which are overlaid with the first eye graphic images and the second eye video images which are overlaid with the second eye graphic images; and
    outputting the first eye video images which are overlaid with the first eye graphic images and the first eye video images which are overlaid with the second eye graphic images, in response to the first command.

2. The method of claim 1, further comprising:
    receiving a second command for deactivating the pop-up interactive graphics stream; and
    reproducing 3D video images by generating first eye video images and second eye video images from the video stream on the display screen, in response to the second command for deactivating the pop-up interactive graphics stream.

3. The method of claim 1, wherein, in the operation of outputting the first eye video images which are overlaid with the first eye graphic images and the first eye video images which are overlaid with the second eye graphic images, 2D video images are reproduced by successively outputting the first eye video image twice.

4. The method of claim 1, further comprising reproducing 3D graphic images by generating the first eye graphic images and the second eye graphic images from an interactive graphics stream in response to the first command user operation.

5. The method of claim 4, wherein:
    the interactive graphics stream is a stereoscopic interactive graphics stream comprising a first eye interactive graphics stream and a second eye interactive graphics stream, and
    the reproducing 3D graphic images comprises:
        generating the first eye graphic images from the first eye interactive graphics stream, and
        generating the second eye graphic images from the second eye interactive graphics stream.

6. The method of claim 4, wherein the reproducing the 3D graphic images comprises:
    generating a graphic image by decoding the interactive graphics stream; and generating the first eye graphic image and the second eye graphic image by shifting the generated graphic image to the left or to the right based on a graphic plane offset value.

7. The method of claim 4, wherein the reproducing the 3D graphic images comprises generating the first eye graphic images and the second eye graphic images, such that an individual depth value is given to each of a plurality of graphic objects.

8. The method of claim 4, wherein the operation of reproducing the 3D graphic images comprises generating the first eye graphic images and the second eye graphic images, such that the same depth value is given to each of the entire 3D graphic images.

9. A video image processing apparatus comprising:
   a video processing unit comprising:
      a first eye video decoder for outputting a first eye video images;
      a second eye video decoder for outputting a second eye video images;
      a first graphic plane for outputting a first eye graphic images; and
      a second graphic plane for outputting a second eye graphic images,
   wherein the video processing unit, in response to request for activating a pop-up interactive graphics stream while outputting the first eye video images which are overlaid with the first eye graphic images and the second eye video images which are overlaid with the second eye graphic images, outputs the first eye video images which are overlaid with the first eye graphic images and the first eye video images which are overlaid with the second eye graphic images.

10. The video image processing apparatus of claim 9, wherein in response to the video processing unit receiving a second command for deactivating the pop-up interactive graphics stream, the video processing unit reproduces 3D video images by generating first eye video images and second eye video images from the video stream.

11. The video image processing apparatus of claim 9, further comprising a graphics decoder configured to generate first-eye graphic images and second-eye graphic images from the interactive graphics stream in response to the first command for activating the pop-up interactive graphics stream, and
   wherein the video processing unit reproduces 3D graphic images by alternately outputting the first-eye graphic images and the second-eye graphic images.

12. The video image processing apparatus of claim 11, wherein:
   the interactive graphics stream is a stereoscopic interactive graphics stream comprising a first eye interactive graphics stream and a second eye interactive graphics stream, and
   the graphics decoder generates the first eye graphic images the from first eye interactive graphics stream and generates the second eye graphic images from the second eye interactive graphics stream.

13. The video image processing apparatus of claim 11, wherein the graphics decoder generates the first eye graphic image and the second eye graphic image by generating a graphic image by decoding the interactive graphics stream and shifting the generated graphic image to the left or to the right based on a graphic plane offset value.

14. The video image processing apparatus of claim 11, wherein the graphics decoder generates the first eye graphic images and the second eye graphic images, such that an individual depth value is given to each of a plurality of graphic objects.

15. The video image processing apparatus of claim 11, wherein the video decoder generates the first eye graphic images and the second eye graphic images, such that the same depth value is given to the entire 3D graphic image.

16. A non-transitory computer-readable recording medium having recorded thereon a computer program for implementing, by a video image processing apparatus, a method of processing a video stream, the method comprising:
   outputting a first eye video images from a fist eye video decoder;
   outputting a second eye video images from a second eye video decoder;
   outputting a first eye graphic images from a first graphic plane;
   outputting a second eye graphic images from a second graphic plane; and
   in response to a request for activating a pop-up interactive graphics stream while outputting the first eye video images which are overlaid with the first eye graphic images and the second eye video images which are overlaid with the second eye graphic images, outputting the first eye video images which are overlaid with the first eye graphic images and the first eye video images which are overlaid with the second eye graphic images.

* * * * *